(12) United States Patent
Osorio et al.

(10) Patent No.: US 7,450,645 B2
(45) Date of Patent: Nov. 11, 2008

(54) METHOD AND SYSTEM FOR TRANSMITTING DIGITAL SIGNALS BETWEEN NODES OF A NETWORK FOR OPTIMIZED PROCESSING AT THE RECEIVING NODE

(75) Inventors: Roberto Osorio, Santiago de Compostela (ES); Gauthier Lafruit, St. Lambrechts Woluwe (ES); Eric Delfosse, Brussels (BE); Jan Bormans, Korbeek-Lo (BE)

(73) Assignee: Interuniversitair Microelektronica Centrum vzw (IMEC), Leuven (BE)

( * ) Notice: Subject to any disclaimer, the term of this patent is extended or adjusted under 35 U.S.C. 154(b) by 649 days.

(21) Appl. No.: 10/424,544

(22) Filed: Apr. 25, 2003

(65) Prior Publication Data

US 2004/0057386 A1 Mar. 25, 2004

Related U.S. Application Data

(60) Provisional application No. 60/376,119, filed on Apr. 26, 2002.

(51) Int. Cl.
*H04N 7/18* (2006.01)
(52) U.S. Cl. .............................. 375/240.25; 375/240.26
(58) Field of Classification Search ................................
375/240.01–240.29
See application file for complete search history.

(56) References Cited

U.S. PATENT DOCUMENTS 6,014,694 A * 1/2000 Aharoni et al. ............. 709/219

OTHER PUBLICATIONS

Cohen-Or, et. al., "Deep Compression for Streaming Texture Intensice Animations," Proceedings of the SIGGRAPH 1999 Annual Conference on Computer Graphics, pp. 261-267, (1999).

Sodagar, et. al., "Scalable Wavelet Coding for Synthetic/Natural Hybrid Images," IEEE Transactions on Circuits and Systems for Video Technolgy, vol. 9, No. 2, pp. 244-254, (Mar. 1999).

"Text of ISO-IEC 14496-2:2001(Unifying N2502, N3307, N3056, and N3664)," Information Technology-Coding of Audio-Visual Objects-part 2: Visual, (Jul. 2001).

Bontempi G et al: "Enabling multimedia (XIS control with black-box medelling" Soft-Ware 2002: Computing in an Imperfect World. First International Conference, Soft-Ware 2002. Proceedings (Lecture Notes in Computer Science vol. 2311) Springer-Verlag berlin, Germany, Apr. 8, 2002,-Apr. 10, 2002 pp. 46-59, XP002311345 ISBN:3-540-43481-X *abstract* Section 1, pp. 46-47; Section 2., pp. 48-51; Section 4., pp. 52-54.

(Continued)

*Primary Examiner*—Andy S Rao
(74) *Attorney, Agent, or Firm*—Knobbe Martens Olson & Bear LLP

(57) ABSTRACT

Embodiments of a method and apparatus for preparing a first node of a communications system for transmitting an encoded digital signal to a second node of the communication system is described for providing Terminal QoS. The encoded digital signal is generated from a digital signal, the first node providing the encoded digital signal and the first node having access to display parameters associated with the digital signal. The second node is for at least decoding the encoded signal within an execution time and for subsequent display, the encoding and/or decoding being defined by at least one encoding-decoding scheme in accordance with coding parameters. The coding parameters are determined for encoding-decoding in accordance with one or more first display quality measures of the decoded signal after decoding, one or more execution times of the decoding of the encoded digital signal, and one or more second display quality measures.

31 Claims, 28 Drawing Sheets

OTHER PUBLICATIONS

Devillers S: "XML and XSLT Modeling for Multimedia Bitstream Manipulation" Proceedings of the Posters of the 10th International World Wide Web Conference, Published on CD ROM, CD-ROM-?May 1, 2001,-May 5, 2001 XP002245841 ISSN: 962-85361-3-3 Retrieved from the Internet: URL:http://wwwIO.org/cdrom/start.htm> retrieved on Dec. 13, 2004?* the whole document.

Henry T M et al: "Foveated texture mapping with JPEG2000 compression" Proceedings 2001 International Conference on Image Processing, ICIP 2001. Thessalonidi, Greece, Oct. 7-10, 2001, International Conference on Image Processing, New York, NY: IEEE, US, vol. vol. 1 of 3, CONF. 8, Oct. 7, 2001, pp. 832-835, XP010563479 ISBN: 0-7803-6725-1 *the whole document*.

ISO/IEC: "Information Technolgy-Multimedia Framwork (MPEG21)" ISO/IEC OTC1/SC29/WG11 N3500, XX, XX, Sep. 30, 2000, pp. 1-62, XP002187095 Section 4.2.3, pp. 14-15; Annex C., pp. 38-41; Annex F., pp. 49-56.

Lafruuit G et al: "3d computational graceful degradation" Proceedings of the IEEE International Symposium on Circuits and Systems—ISCAS 2000, Geneva, vol. 3, May 28, 2000,-May 31, 2000 pp. 547-550, XP010502589 Lausanne, Switzerland *the whole document*.

MPEG-4 Video Verification Model Version 18.0, ISO/IEC JTC1/SC29/WG11 N3908, XX, XX, Jan. 2001, pp. 1-412, XP000997152 Section 5.9.1 and5.9.3; Sections 1, 2.1, 3.7, 2.7.1, 3.7.2, 3.9, 3.9.1-3.9.7, 4.9.1, 4.9.1.1-4.9.1.12, 4.10, 4.10.3, 5.8.1, 5.8.1.1.

Ngoc N F et al: "A Qo5 framework for interactive 3D applications" Proceedings of the 10th International Congernce in Central Europe on Computer Graphics, Visualization and Computer Vision 2002, Journal of WSCG, Univ. West Bohemia Czech Republic, vol. 10, No. 2, Feb. 4, 2002,-Feb. 8, 2002 pp. 317-324, XP008040521 ISSN:1213-6972 *abstrct* Sections 2.,3.,5.3 and 6.

* cited by examiner

| l \ b | Floor | Ceil | Linear |
|---|---|---|---|
| Floor | $Q_{12}$ | $Q_{13}$ | $(Q_{12}+Q_{13})/2$ |
| Ceil | $Q_{22}$ | $Q_{23}$ | $(Q_{22}+Q_{23})/2$ |
| Linear | $(Q_{12}+Q_{22})/2$ | $(Q_{13}+Q_{23})/2$ | $(Q_{12}+Q_{22}+Q_{13}+Q_{23})/4$ |

$N + W \rightarrow 1$
$W + N \rightarrow 2$
$NE + N \rightarrow 1$
$NE + E \rightarrow 4$

| | $x$ | $y$ | $z$ |
|---|---|---|---|
| $a$ | | 1 | |
| $b$ | 2 | 3 | 4 |
| $c$ | 5 | | |

**Looking for *60* inside the table. Coordinates are:**

No interpolation: (1, 4)
True interpolation: (1, 4.5)  $\left(4 + (60-50) \cdot \dfrac{6-4}{90-50}\right)$ Only averaging: (1, 5)

| 1 | 2 | 4 | 6 |
|---|---|---|---|
| ... | 30 | 50 | 90 |
|  | ... | ... | ... |

Fig. 5

```xml
<tableParameter name="time">
  <tableAddressing>
    <tableReference name="execTime" />
    <tableCoordinates name="levelAndBitp" />
  </tableInverseAddressing>
  <tableReference name="wavDecParam" />
  <content>
    <tableParameter name="quality">
      <tableAddressing>
        <tableReference name="qualityPSNR" />
        <row>
          <inputValueReference name="angle" />
        </row>
        <column>
          <inputValueReference name="distance" />
        </column>
      </tableAddressing>
    </tableParameter>
    <content>
    </tableInverseAddressing>
  </tableCoordinates>
</tableParameter>
```

| Element: *Table* | |
|---|---|
| | [diagram: Table → row (1..∞) of rowType → column (1..∞)] |
| | `<xs:element name="Table">` |
| | `<xs:complexType>` |
| | `<xs:sequence>` |
| | `<xs:element name="row" type="rowType" maxOccurs="unbounded"/>` |
| | `</xs:sequence>` |
| | `<xs:attribute name="tableName" type="xs:ID" use="required"/>` |
| | `<xs:attribute name="rowName" type="xs:string" use="required"/>` |
| | `<xs:attribute name="columnName" type="xs:string" use="required"/>` |
| | `<xs:attribute name="rowRounding" type="roundingMethodType" use="required"/>` |
| | `<xs:attribute name="columnRounding" type="roundingMethodType"` |

Fig. 6b continued

```
    use="required"/>
    <xs:attribute name="favorExactMatch" type="yesNoType" use="required"/>
    <xs:attribute name="marginPercentage" type="xs:double" use="required"/>
    <xs:attribute name="lowerHigherBoth" type="lowerHigherBothType"
use="required"/>
    <xs:attribute name="rowInterpolation" type="interpolationType" use="required"/>
    <xs:attribute name="columnInterpolation" type="interpolationType"
use="required"/>
    <xs:attribute name="firstCriterion" type="criteriaType" use="required"/>
    <xs:attribute name="secondCriterion" type="criteriaType" use="required"/>
  </xs:complexType>
</xs:element>
```

Type: *row*

```
<xs:complexType name="rowType">
  <xs:sequence>
    <xs:element name="column" type="columnType" maxOccurs="unbounded"/>
```

Fig. 6b continued

```
</xs:sequence>
<xs:attribute name="value" type="xs:double" use="required"/>
</xs:complexType>
```

Type: *column*

```
<xs:complexType name="columnType">
  <xs:simpleContent>
    <xs:extension base="xs:double">
      <xs:attribute name="value" type="xs:double" use="required"/>
    </xs:extension>
  </xs:simpleContent>
</xs:complexType>
```

Type: *roundingMethod*. Allowed rounding methods for normal addressing

```
<xs:simpleType name="roundingMethodType">
```

Fig. 6b
continued

```
<xs:restriction base="xs:string">
  <xs:enumeration value="floor"/>
  <xs:enumeration value="ceiling"/>
  <xs:enumeration value="linear"/>
</xs:restriction>
</xs:simpleType>
```

Type: *yesNo*

```
<xs:simpleType name="yesNoType">
  <xs:restriction base="xs:string">
    <xs:enumeration value="yes"/>
    <xs:enumeration value="no"/>
  </xs:restriction>
</xs:simpleType>
```

Fig. 6b
continued

Type: *lowerHigherBoth*. Lower-higher-both selection for inverse addressing

```
<xs:simpleType name="lowerHigherBothType">
  <xs:restriction base="xs:string"/>
    <xs:enumeration value="lower"/>
    <xs:enumeration value="higher"/>
    <xs:enumeration value="both"/>
  </xs:restriction>
</xs:simpleType>
```

Type: *interpolation*. Interpolation modes allowed for inverse addressing

```
<xs:simpleType name="interpolationType">
  <xs:restriction base="xs:string"/>
    <xs:enumeration value="none"/>
    <xs:enumeration value="average"/>
    <xs:enumeration value="interpolate"/>
  </xs:restriction>
```

Fig. 6b (final)

</xs:simpleType>

Type: *criteria*. Selection criteria when more than one match exists.

```
<xs:simpleType name="criteriaType">
  <xs:restriction base="xs:string">
    <xs:enumeration value="N"/>
    <xs:enumeration value="S"/>
    <xs:enumeration value="E"/>
    <xs:enumeration value="W"/>
    <xs:enumeration value="NE"/>
    <xs:enumeration value="NW"/>
    <xs:enumeration value="SE"/>
    <xs:enumeration value="SW"/>
  </xs:restriction>
</xs:simpleType>
```

Fig. 6c continued

```
<xs:element name="tableSelectionReference" type="referenceType"/>
<xs:element ref="tableSelection"/>
</xs:choice>
</xs:sequence>
</xs:choice>
<xs:choice>
<xs:sequence>
<xs:element name="row" type="tableParameterType"/>
<xs:element name="column" type="tableParameterType"/>
</xs:sequence>
<xs:element ref="tableCoordinates"/>
<xs:element name="tableCoordinatesReference" type="referenceType"/>
</xs:choice>
</xs:sequence>
</xs:complexType>
</xs:element>
```

Fig. 6c continued

```
    </xs:sequence>
   </xs:choice>
   <xs:element name="content" type="tableParameterType"/>
  </xs:sequence>
 </xs:complexType>
</xs:element>
```

Element: *tableSelection*

```
<xs:element name="tableSelection">
 <xs:complexType>
  <xs:all>
   <xs:element ref="tableMasking" maxOccurs="unbounded"/>
```

```
<xs:element ref="tableSelection" maxOccurs="unbounded"/>
<xs:element name="tableSelectionReference" type="referenceType"
maxOccurs="unbounded"/>
</xs:all>
<xs:attribute name="name" type="xs:ID" use="required"/>
<xs:attribute name="operation" type="tableSelectionOperationType"
use="required"/>
</xs:complexType>
</xs:element>
```

Element: *tableMasking*

```
<xs:element name="tableMasking"/>
  <xs:complexType>
    <xs:sequence>
      <xs:element ref="tableMaskingCondition" maxOccurs="unbounded"/>
    </xs:sequence>
    <xs:attribute name="tableName" type="xs:IDREF" use="required"/>
  </xs:complexType>
</xs:element>
```

Element: *tableMaskingCondition*

```
<xs:element name="tableMaskingCondition"/>
  <xs:complexType>
    <xs:attribute name="type" type="conditionTypeType" use="required"/>
    <xs:attribute name="appliedOn" type="appliedOnType" use="required"/>
```

Fig. 6c continued

```
    <xs:attribute name="value" type="xs:string"/>
   </xs:complexType>
  </xs:element>
```

Element: *tableParameter*

```
<xs:element name="tableParameter" type="tableParameterType"/>
```

Fig. 6c continued

```
    <xs:attribute name="coordinatesName" type="xs:string"/>
   </xs:complexType>
  </xs:element>
  <xs:element name="columnFromCoordinates" minOccurs="0">
   <xs:complexType>
    <xs:attribute name="coordinatesName" type="xs:string"/>
   </xs:complexType>
  </xs:element>
 </xs:choice>
 <xs:attribute name="name" type="xs:ID"/>
</xs:complexType>
```

Type: *reference*

```
<xs:complexType name="referenceType">
 <xs:attribute name="name" type="xs:IDREF"/>
</xs:complexType>
```

Fig. 6c continued

Type: *conditionType*

```
<xs:simpleType name="conditionTypeType">
  <xs:restriction base="xs:string">
    <xs:enumeration value="gt"/>
    <xs:enumeration value="ge"/>
    <xs:enumeration value="lt"/>
    <xs:enumeration value="le"/>
    <xs:enumeration value="eq"/>
    <xs:enumeration value="neq"/>
  </xs:restriction>
</xs:simpleType>
```

Fig. 6c continued

| Type: *applienOn* | |
|---|---|
| | `<xs:simpleType name="appliedOnType">`<br>`<xs:restriction base="xs:string">`<br>`<xs:enumeration value="row"/>`<br>`<xs:enumeration value="column"/>`<br>`<xs:enumeration value="content"/>`<br>`</xs:restriction>`<br>`</xs:simpleType>` |

| Type: *tableSelectionOperation* | |
|---|---|
| | `<xs:simpleType name="tableSelectionOperationType">`<br>`<xs:restriction base="xs:string">`<br>`<xs:enumeration value="and"/>`<br>`<xs:enumeration value="or"/>` |

```
<xs:enumeration value="not"/>
<xs:enumeration value="add"/>
<xs:enumeration value="mult"/>
</xs:restriction>
</xs:simpleType>
```

Fig. 6c (final)

Fig. 7

```xml
<tableCoordinates name="levelAndBitpInBudget">
<tableInverseAddressing>
<tableReference name="execTime"/>
<content>
<tableParameter name="time">
<selectionCriteria name="execTime"/>
<selectSelection name="timeWithinBudget" operation="and">
<tableMasking tableName="execTime">
<tableMaskingCondition type="le" appliedon="content" value="timeBudget"/>
</tableMasking>
</tableSelection>
<tableCoordinates name="levelAndBitp">
<tableInverseAddressing>
<tableReference name="wavDecParam"/>
<content>
<tableParameter name="quality">
<tableAddressing>
<tableReference name="qualityPSNR"/>
<row>
<inputValueReference name="angle"/>
</row>
<column>
<inputValueReference name="distance"/>
</column>
</tableAddressing>
</tableParameter>
</content>
</tableInverseAddressing>
</tableCoordinates>
</tableParameter>
</content>
</tableInverseAddressing>
</tableCoordinates>
```

METHOD AND SYSTEM FOR TRANSMITTING DIGITAL SIGNALS BETWEEN NODES OF A NETWORK FOR OPTIMIZED PROCESSING AT THE RECEIVING NODE

RELATED APPLICATION

This application claims priority under 35 U.S.C. § 119(e) to U.S. Provisional Application No. 60/376,119, filed Apr. 26, 2002 and titled "NOTABLE: NORMATIVE TABLE DEFINITION ENABLING TERMINAL QOS," which is hereby incorporated by reference in its entirety.

BACKGROUND OF THE INVENTION

1. Field of the Invention

The present invention relates to a method, system and network elements for transmission of encoded signals between nodes of a telecommunications network and the decoding and processing of the encoded signal at the receiving node as well as to computer software for coordinating transmission, decoding and processing in an optimum way. The present invention also relates to a description useful for decoding an encoded bit stream, a method of using such a description so as to decode and process the bit stream in a destination terminal. The invention also relates to an electronic device designed for implementing such a method of generating such a description. The invention also relates to a transmission system comprising a transmitter and a receiver, said transmitter having means for implementing such a method of generating an encoded bit stream and a description therefor from a source signal.

2. Description of the Related Technology

Network environments have undeniably grown to an important communication tool in our society. The increasing trend to user mobility and associated ubiquitous multimedia access, leads to a proliferation of a heterogeneous set of terminals, e.g., high-resolution televisions, high-end graphics workstations, PCs, game consoles and low-end portable devices.

Cost is the driving force behind this differentiation: the lower the cost to the end user, the more technological restrictions are imposed (e.g., constraints in silicon size and power consumption), and the lower the access bandwidth and processing capabilities of the appliance. Furthermore, with the advent of multiple connected environments, one single terminal can be simultaneously connected to different servers, therefore consuming content with potentially highly, dynamically and stochastically changing characteristics.

Network Quality of Service (Network QoS), guaranteeing a service quality under constrained network conditions, has since several years got a lot of attention. However, Quality of Service dedicated to the Terminal (Terminal QoS), where the application is matched to the processing power of the terminal, is a relatively new topic of research.

Today, whereas streaming video is common practice, the streaming of 3D content remains rare, or even nonexistent. When decoding and rendering 3D content, the workload on the consumer's platform heavily varies over several orders of magnitude with the viewing conditions. As mostly only a part of the textured 3D objects is visible at any given time, streaming and/or decoding only the visible regions of the texture will reduce instantaneous bandwidth and/or platform workload. When the viewing conditions change, the newly visible parts can be streamed and/or decoded as they gradually become visible. Consequently, the required network bandwidth as well as the required workload for decoding and rendering textured 3D content are spread over time while minimizing the perceived quality loss. This process is known as view-dependent texture decoding [D. Cohen-Or, Y. Mann, S. Fleishman, "Deep Compression for Streaming Texture Intensive Animations," Proceedings of the SIGGRAPH 1999 annual conference on Computer graphics, pp. 261-267, 1999.].

Within the MPEG-4 multimedia compression standard ["The MPEG-4 Audio-Visual Compression Standard, Text of ISO/IEC 14496-5/FPDAM1," ISO/IEC JTC1/SC29/WG11/MPEG99/N3309, Noordwijkerhout, March 2000.], tools are available for coding 3D content. In particular, MPEG-4 provides a scalable, wavelet based, compression tool for textures, called Visual Texture Coding (VTC) [I. Sodagar, H. J. Lee, P. Hatrack, Y. Q. Zhang, "Scalable Wavelet Coding for Synthetic/Natural Hybrid Images," IEEE Transactions on Circuits and Systems for Video Technology, Vol. 9, No. 2, pp. 244-254, March 1999.].

SUMMARY OF CERTAIN INVENTIVE ASPECTS

Certain embodiments provide a system and a method of improving terminal QoS. Included is a method of preparing a first node of a communications system for transmitting an encoded digital signal to a second node of the communication system, the encoded digital signal being generated from a digital signal, the first node providing the encoded digital signal and the first node having access to display parameters associated with the digital signal, the second node being for at least decoding of the encoded signal within an execution time and for subsequent display, the encoding and/or decoding being defined by at least one encoding-decoding scheme in accordance with coding parameters. Embodiments of the method comprise determining the coding parameters for encoding-decoding in accordance with: (i) one or more first display quality measures of the decoded signal after decoding, the one or more first display quality measures being a function of the coding parameters; (ii) one or more execution times of the decoding of the encoded digital signal, the one or more execution times being a function of the coding parameters; and (iii) one or more second display quality measures, the one or more second display quality measures being a function of the display parameters.

In some aspects the at least one encoding-decoding scheme is scalable so that a quality degradation resulting from selection of a first display quality measure results in a shorter decoding execution time. Determining the coding parameters includes linking a second quality display measure with a display parameter associated with the digital signal and minimizing a difference between the linked second quality display measure and one first display quality measure while keeping an execution time associated with the one first display quality measure within a constraint.

In some embodiments the digital signal is a representation of at least one image of a 3-D object. The display parameters may represent viewing conditions of the 3-D object at the second node. For example, the display parameters may include one or more of: visualization distance of the object when displayed, viewing angle of the object when displayed.

The coding-decoding scheme may be any suitable compression coding scheme which may be based, for example on a wavelet transform, a discrete cosine transform, a Fast Fourier Transform, a Discrete Fourier Transform. In certain embodiments, the coding parameters can include one or more of: number of levels of the coding scheme, number of bits per compression co-efficient of the coding scheme, ratio of number of source signal frames to the number of frames of the source signal used in the coding scheme in a framed data signal. For example, the coded signal can be a MPEG-2 or 4 or JPEG 2000 signal.

In other aspects the first or second display measures include one or more of: PSNR, a degradation value defined as any difference between an object's image, rendered at unconstrained resources and the object's image obtained after rendering with degraded settings, that is, less mesh resolution.

In certain aspects the first node generates one or more execution times of the decoding of the encoded digital signal in function of the coding parameters from system information defining resources of the second node. As an example, the system information of the second node can comprise one or more of memory type, microprocessor type, access time to memory, time budget per elementary operation of a processor. One aspect includes transmitting the system information defining resources of the second node from the second node to the first node. In addition, the first node may generate one or more execution times of the decoding of the encoded digital signal in function of the coding parameters from decoding algorithm characteristics. The decoding algorithm characteristics can include, for example, one or more of: number of multiplications and additions to perform the decoding, number of memory accesses to perform the decoding.

Embodiments also include an arrangement for preparing a first node of a communications system for transmitting an encoded digital signal to a second node of the communication system, the encoded digital signal being generated from a digital signal, the first node providing the encoded digital signal and the first node having access to display parameters associated with the digital signal, the second node being for at least decoding of the encoded signal within an execution time and for subsequent display, the encoding and/or decoding being defined by at least one encoding-decoding scheme in accordance with coding parameters. The arrangement comprises means for determining the coding parameters for encoding-decoding comprising means for selecting one or more first display quality measures of the decoded signal after decoding in function of the coding parameters, means for selecting one or more execution times of the decoding of the encoded digital signal in function of the coding parameters, and means for selecting one or more second display quality measures in function of the display parameters. The means for determining the coding parameters can include means for linking a second quality display measure with a display parameter associated with the digital signal and means for minimizing a difference between the linked second quality display measure and one first display quality measure while keeping an execution time associated with the one first display quality measure within a constraint. The means for generating the one or more execution times can be adapted to generate the execution times from system information defining resources of the second node. In some aspects the arrangement also has means for transmitting the system information defining resources of the second node from the second node to the first node. The means for generating may generate the execution times from decoding algorithm characteristics.

Certain embodiments also include a computer program product for preparing a first node of a communications system for transmitting an encoded digital signal to a second node of the communication system, the encoded digital signal being generated from a digital signal, the first node providing the encoded digital signal and the first node having access to display parameters associated with the digital signal, the second node being for at least decoding of the encoded signal within an execution time and for subsequent display, the encoding and/or decoding being defined by at least one encoding-decoding scheme in accordance with coding parameters. The computer program product comprises code which, when executed on a computing device provides: means for determining the coding parameters for encoding-decoding comprising means for selecting one or more first display quality measures of the decoded signal after decoding in function of the coding parameters; means for selecting one or more execution times of the decoding of the encoded digital signal in function of the coding parameters; and means for selecting one or more second display quality measures in function of the display parameters. Also included is a computer readable storage medium storing the computer program product, e.g., a CD-ROM, a DVD-ROM, magnetic tape, a memory, diskettes, or a hard drive.

An aspect of certain embodiments includes the concept of Terminal QoS (using a 3D example) and a generic solution therefore. The embodiments provide a method of terminal capabilities assessment and a server-client approach. In another aspect, provided are normative tables, including table addressing and table selection operations.

Certain embodiments will now be described with reference to the following drawings.

BRIEF DESCRIPTION OF THE DRAWINGS

FIG. 5 is an example of different interpolations which can be used with embodiments of the present invention.

FIG. 6a shows a tagged language representation of addressing example in accordance with an embodiment of the present invention.

FIG. 6b shows a tagged language representation of a Schema for a table definition in accordance with an embodiment of the present invention.

FIG. 7 shows an example of selection of the best settings for a given time budget.

DETAILED DESCRIPTION OF CERTAIN EMBODIMENTS

Figure 1:
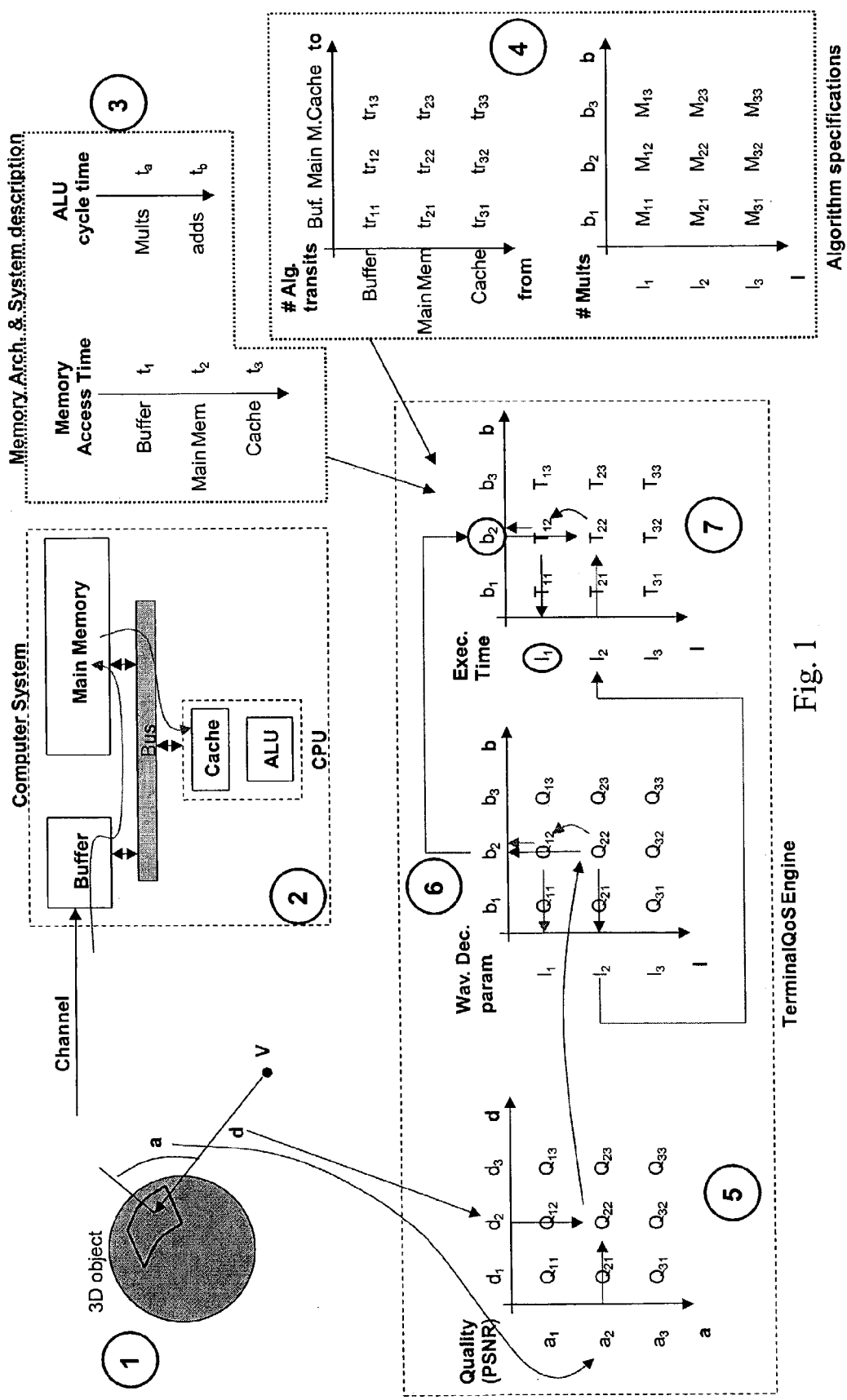
FIG. 1 is a schematic diagram indicating aspects of the present invention including decision tables for Terminal QoS in accordance with embodiments of the present invention.

Embodiments of the present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Figure 8:
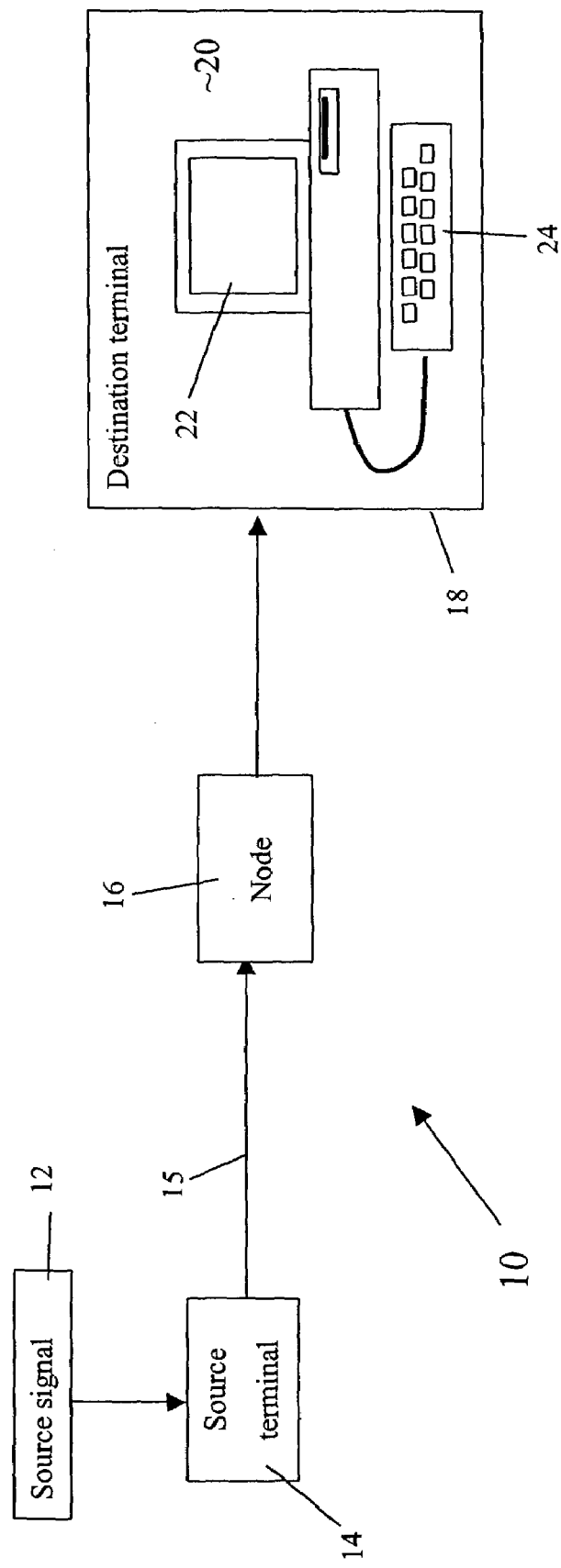
FIG. 8 shows a representative telecommunications network that may be used with embodiments of the present invention.

In the following a client-server arrangement of a communications network 10 is disclosed comprising a source terminal or transmitter 14, a communications channel 15 and a destination terminal or receiver 18 as shown schematically in FIG. 8. There may be one or more intermediate nodes 16 between source and destination terminals 14, 18. These nodes 16 may also be capable of carrying out processes in accordance with certain embodiments. The destination terminal 18 will typically be a computer 20 such as a personal computer or a workstation comprising a display 22 and one or more types of input devices 24 such as a keyboard, a digitizing pen, a scanner, a mouse, a game joystick, etc. as is well known to the skilled person. A source signal 12 such as an image is received or generated at the source terminal 14 and is coded in accordance with a coding scheme to form a coded digital signal. This coding scheme has coding parameters which may effect the nature of the coded signal, e.g., its compression, its resolution, etc. An example of a coding scheme can be based on a wavelet transform, a Discrete Cosine transform, a Fourier Transform, a Discrete Fourier transform coding scheme or any derivative of these. These are typically scalable compression coding schemes. Some embodiments include the server 14 or the node 16 selecting one of several coding-decoding schemes, e.g., depending upon the resources available at the destination terminal 18. The coding scheme may have different levels, e.g., different levels of a wavelet coding scheme. The scalability of the coding scheme may be provided by selection of different frequency components of the coded signal, e.g., in wavelet coding the wavelet transform generates for each level, image components which have different resolutions. Additional coding steps may be performed, e.g., entropy coding before transmission. Further, for wavelet coding zero-tree coding may also be performed.

The coded signal is transmitted over the channel 15 and is received at the destination terminal 18 where it is decoded. If the source signal was an image, this image may be displayed at terminal 18. The display process may require rendering of the image on a display such as a CRT or flat panel display such as an LCD, a plasma display or similar. The provision of complex images requires certain capabilities or resources in the destination terminal 18. Depending on the capabilities of terminal 18 such as microprocessor clock speed, size and number of cache memories, size and clock speed of Random Access Memory, bus bandwidth, an image may be displayed easily or with great difficulty or quickly or slowly. In accordance with certain embodiments, a system and method is provided for the source terminal 14 or an intermediate node 16 to adapt the coding parameters of the coding scheme of the source digital signal in such a way as to optimize the display at the destination terminal 18 in terms of certain quality values such as resolution while remaining within at least one constraint, e.g., execution time.

In the following reference to "terminal" refers to the destination terminal or receiver terminal 18 unless otherwise stated. The provision of Terminal Quality of Service is the process of scaling, preferably optimally scaling the decoding and at least one processing operation such as rendering computations for rendering of an image to the available terminal processing resources, while optimizing, preferably maximizing, the overall quality of the at least one processing operation, e.g., of the perceived (displayed) image. For example, with reference to the display of images at a terminal 18 in accordance with MPEG-21, this process takes place in the Resource Adaptation engine. As an example, this process is applied here for a real-time 3D decoding and rendering engine, exploiting scalable MPEG-4 coding algorithms. In particular, for an MPEG-4, 3D transmission application, the compressed 3D content is scaled to the processing capabilities of the terminal, e.g., it is scaled down to the capabilities of the destination terminal. However, the skilled artisan will appreciate that this is only one example of the application of methods in accordance with the present invention.

In accordance with certain embodiments, this process can be achieved by defining all relevant information through appropriate normative tables. In certain aspect, tables that allow to describe relations between media resources, quality and computational/implementation complexity which are used to steer Terminal QoS decisions in the resource adaptation engine. The scaling of the coding operation can be done in the source terminal 14, e.g., a server, however, this is not a requirement. This scaling can also be done in a node 16. An example is where a server 14 sends images to a variety of destination terminals having different capabilities. The server cannot adapt itself to each destination terminal and at the same time send only one signal. In such a case, a node 16 closer to each relevant terminal may decode and re-code or transcode the signal to be appropriate for the destination, terminal it serves. It this manner a server may send the highest quality image by a broadband channel 15 and then each relevant node can adapt the coded image signal for its associated destination terminal.

FIG. 1 shows a walkthrough of the process of Terminal QoS decision based on a 3D example in accordance with certain embodiments. A 3D object (1) is an image having a certain representation in digital form. As an example it may consist of a mesh and wavelet coded texture. The complete image can be represented by a digital signal, e.g., a bitstream, that can be transmitted through a channel to a suitable terminal (2). This terminal will generally have a means for processing the received signal and a means for displaying the image. The signal is coded in a form suitable for transmission over the channel. Examples of such coding are well known to the skilled person and may include one or more of error coding, forward error coding, compression coding, channel coding such as block or trellis coding, interleaving, etc. The terminal (2) is able to decode the coded signal. For this purpose it may include a Central Processing Unit, e.g., a microprocessor such as a Pentium IV processor as supplied by Intel Corp. or similar. This processing unit usually cooperates with a main memory via a bus system. The CPU may have a local cache memory for storing data that is to be re-used and to thus reduce the number of accesses to main memory. In order to allow processing of the data by various decoding algorithms and/or to provide rate adaption a buffer may be provided for receiving the coded signal and for buffering a part of it for a certain time.

Figure 2:
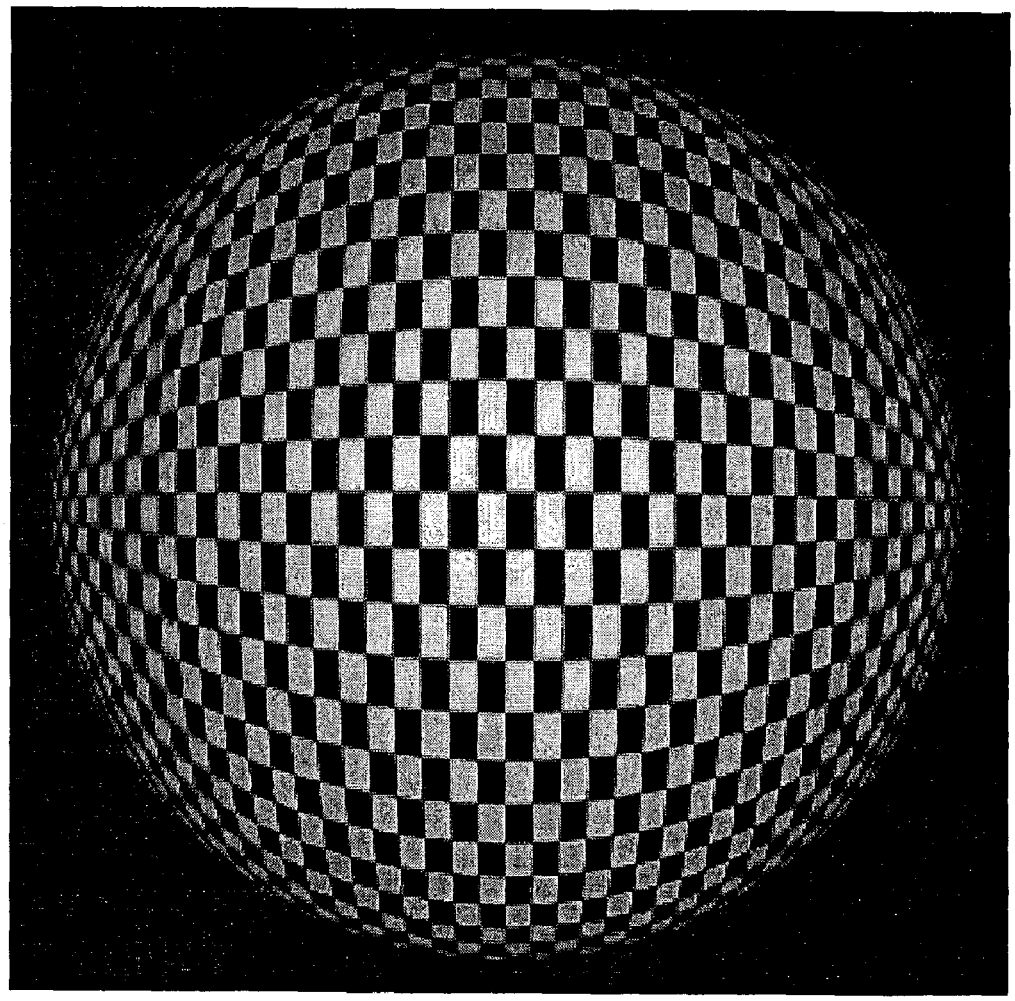
FIG. 2 shows a textured sphere as an example of a 3-D representation of an object to be displayed.

If the received signal is a coded 3-D image, the signal is decoded by the CPU and the decoded image is displayed, e.g., on a CRT, plasma display, LCD, or similar display. Generally, a 3-D image is displayed by displaying a basic shape of the object (1), e.g., in the form of a mesh and then applying a surface texturing. Depending on the viewing angle (a) and distance (d) to the object (1), the texture does not have to be decoded at full resolution (see also FIG. 2). Texture regions near the sphere silhouette may be decoded at lower resolution, for example. Nor does the complete object have to be textured as the side of the object which cannot be seen does not need texturing. In general, the required texture resolution for each part of the texturing, i.e. for each texture "patch", may be defined as a quality measure $Q_{ij}$, which is a function of the viewing angle $a_i$ and object distance $d_j$. This is shown schematically in FIG. 1 at (5) in which a table is provided giving a value $Q_{ij}$ for each combination of viewing angle $a_i$ and object distance $d_j$. This table may be stored in the main memory, but the embodiments described herein are not limited to tabular methods of storing this data.

As an example in FIG. 1, the patch needs a quality $Q_{22}$, which is obtained by configuring the wavelet texture decoder at parameters $l_2$ and $b_2$ (representing, for example, respectively the number of decoded wavelet levels and the number of decoded bit per wavelet coefficient), using the information of table (6).

For real-time rendering, the system should ideally ensure that the decoding can be done within fixed contraints, e.g., within a fixed execution time. This is checked by consulting table (7) in FIG. 1, which gives the estimated execution time $T_{ij}$ as a function of the $l_i$ and $b_j$ parameters appropriate for the quality level $Q_{22}$. These execution times may for instance be statistically evaluated during an off-line calibration phase and then stored, e.g., in the main memory or may be calculated on the fly. Other estimation methods are presented below.

If the system judges that the execution time for decoding is too large, parameters $l_i$ and $b_j$ may be adjusted to keep the processing load within certain limits as indicated by the arrows in table (7) which show the change from $T_{22}$ to $T_{12}$. In order to achieve this new (and shorter execution time) a quality parameter will have to be changed, usually to result in a lower quality, i.e. a degraded quality measure. For example, the texture quality is degraded as indicated by the arrows in table (6)) which show the change from $Q_{22}$ to $Q_{12}$. This is the best one can do, given the limitations of the system.

Tables (5) and (6) contain valuable information related to the visual quality of the process. For example, this information can be transmitted as meta-data to a terminal, e.g., to a node of the communications network 10, possibly for each individual object of the 3D scene. The node may be a server 14 or the destination terminal 18 or an intermediate node 16. Table (7) in FIG. 1 is specific to the design of the destination terminal 18. The server or source terminal 14 or a node 16 may take appropriate actions to degrade the content in function of the terminal's (18) capabilities. This table (7) can be optionally transmitted through a channel to the server 14 or to the relevant node 16 or is transmitted by some other means.

As an example, table (7) can be evaluated by an off-line calibration process to know how the system of terminal 18 behaves under specific decoder settings. This information can then be transmitted through an appropriate channel to the relevant node 14, 16 of the network, e.g., to the server 14. Such an off-line calibration process can be quite cumbersome, since it is a long procedure that must be applied for each single terminal 18. A more appropriate solution may consist in determining the system's behavior through a description of the processing architecture of terminal 18 which is transmitted instead of the table (7). The receiving terminal 14, 16 is then able to generate information such as the information available from table (7) by examining the architecture and manipulating the values therein. This architecture is shown schematically as items (2) and (3) in FIG. 1. This architecture may be transmitted to the relevant node 14, 16 of the network 10 and may include any of: the destination terminal system architecture (e.g., (2) in FIG. 1), access times to memories and cycles per elementary operation (e.g., (3)). Further, algorithmic characteristics ((4) in FIG. 1) of the decoding scheme, e.g., of a wavelet decoder, is also transmitted to the relevant node 14, 16 as well as the architecture information. For example, one or more of the following decoding algorithm characteristics can be transmitted: number of multiplications, adds, memory transits, etc. for the given algorithm. Execution times may then be estimated quite accurately by a suitable calculation technique of which Queueing model theory is only one example. Thus, instead of performing off-line calibration of the system performance of terminal 18, relevant details of the operating system of terminal 18 such as the memory and system's architecture ((2) and (3) in FIG. 1) can be provided to the relevant node, e.g., to the server 14 or another node 16, which then may estimate the terminal's execution time using this information and the algorithmic specifications (4) of the relevant decoder, e.g., wavelet decoder. The server 14 or node 16 can then take appropriate actions, e.g., simplify the 3D content ahead of the transmission to the terminal 18, such that its operation conditions are certified to be real-time or to be within a certain constraint such as a time constraint.

As shown by schematically in FIG. 1, all Terminal QoS decisions are based on sensitive information that is stored in a suitable form, e.g., in tables, with different possible information axes. The reference to tables should be understood as only a method of representing this information but not to the way such information content is physically supplied, transmitted, generated or stored. The tables may be in any suitable form, e.g., as a list, a table, a matrix, an array or analytic functions. Each axis of the table corresponds to one particular parameter that should be explicitly fixed. Note that these parameters can be input or output parameters. For instance, table (5) uses input parameters and provides an output value $Q_{ij}$ (normal addressing). Table (6) works the other way around (inverse addressing): a value in the table triggers some instantiations of the parameters (here, $l_2$ and $b_2$). Moreover, table (7) uses $l_2$ and $b_2$ in order to get $T_{22}$, which can be bigger than the time budget for this operation. In such a case, a lower value is chosen ($T_{12}$) and the wavelet parameters are $l_1$ and $b_2$.

Table syntax need not be restricted to a mere array of values. As the tables contain discrete information, addressing an element in the table can be ambiguous. Looking for example for the element at (3.5, 4) can be a problem if the values at the axis are only integers. Thus, some extra parameters can be provided in order to specify for each table which value is preferred. Inverse addressing may require additional parameters in order to guide the search.

Routing mechanisms are preferably implemented that allow using the output of a table as the input to another, linking the operations described above. It also preferable to be able to select a part of a table and apply other operations on that selection. This will allow, for example, restricting the search to elements within the time budget in table (7). All these operations are preferably expressed in a simple way. For example, the table definition and table selection may be standardized so that all systems use the same format. Given the wide variety of terminals and media resources characteristics, the number of adaptation possibilities is huge. Certain embodiments provide tools that allow performing efficient adaptation by means of an optimal choice of settings.

In accordance with certain aspects, two modes of accessing a table can be distinguished. For the normal addressing mode, a set of coordinates is given and the value of an element inside the table is obtained. For the inverse addressing mode, a value is given and a set of coordinates is obtained. Moreover, depending on the nature of the data stored in a table and also the axes, several possibilities exist for addressing.

Normal addressing is the simplest mode but some ambiguity can exist. In another embodiment, three methods are proposed for avoiding ambiguity in normal addressing mode: floor, ceil and linear. Combined with the two axes (row and column), nine quality possibilities exist as is shown schematically in FIG. 3. For a combination $l_x$, $b_y$, which does not lie exactly at a table entry, floor refers to selecting the lower value. In the case of floor—floor this means $Q_{12}$ which is lower than the position of the intersection of $l_x$ and $b_y$. Ceil refers to "ceiling" i.e. the upper value is taken. Linear is a combination of two values or interpolation between two values.

The inverse addressing operation consists of looking in the table for the best match and returning the corresponding row and column values. As the layout of the values in a table can follow unusual patterns, and uniqueness is not guaranteed, many parameters may be needed to guide an optimal search, e.g., one or more of:

favorExactMatch. In addition to an exact match, non-exact exist with lower cost/higher performance. This parameter allows selecting if an exact match is also preferred or not.

marginPercentage. In case of allowing non-exact matches, values in a specified margin or tolerance (as a % of the requested value) are considered for selection.

lowerHigherBoth. Sometimes only lower or only higher values can be accepted.

rowInterpolation. Three or more values are possible: none, interpolated average and interpolation.

columnInterpolation. Three or more values are possible: none, average and interpolation.

firstCriterion. In case several potential candidates exist, a criterion is necessary for selection (see FIG. 4).

secondCriterion. A second criterion can be also necessary.

The selection criteria and interpolation features deserve further explanation.

Figures 3, 4:
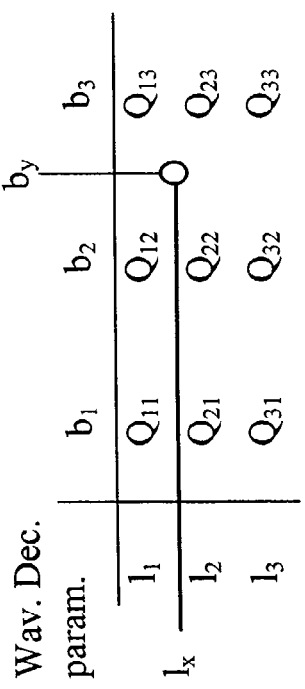
FIG. 3 shows schematically rounding methods for table selection in accordance with an embodiment of the present invention.
FIG. 4 shows an example of criteria application for selection which can be used with embodiments of the present invention.

Selection criteria are applied when several choices are possible. In that case it is possible to specify that a lower (or higher) value in a given axis is preferred, or the closer value to the origin, etc. These possibilities can be expressed as N, S, E, W, NE, NW, SE and SW. If the ambiguity is not removed with the first criterion, the second one is applied. FIG. 4 shows an example where 5 elements are equally ranked and ambiguity must be removed.

When an exact match is not found, the closest value can be selected whereby closeness may be determined in accordance with an algorithm, e.g., with respect to a closeness criterion. In accordance with certain embodiments, interpolation, e.g., linear interpolation between values may be performed which may lead to a much better selection. An example of this is shown in FIG. 5. In this simplified example, only a search in a row is considered. The requirement is to find 60 that is not present explicitly contained within the table. If the closest value is taken, this is the column value 4. A simple average of adjacent entries gives the closest value being the average of 50 and 90 which is 70. This relates to the column value of 5. Alternatively, linear interpolation gives column values of between 4 and 6 gives a value of 4.5.

In other embodiments, table addressing can be expressed in a tagged mark-up language such as SGML of which XML is one example. One aspect includes an XML-based table definition and table selection. This enables Terminal QoS, for example, in the context of an image or video transfer protocol such as MPEG-21 Digital Item Adaptation. Some embodiments provide tools that comprise the description of the links between relevant information (e.g., computational complexity vs. resource quality) by means of tables and the description of the links between those tables as well as the description of search parameters in order to steer trade-off decision-making.

Both normal and inverse modes may be expressed using XML. The complete schema specification is shown in FIG. 6b. An example is seen in FIG. 6a. Given parameters angle and distance, quality is addressed in qualityPSNR table (table (5)). Then, an inverse addressing is performed on table wavDecParam (table (6)) using quality. The result is a set of coordinates (level and bitplane) that is used to find a value for time in execTime table (table (7)).

It can be necessary for some applications to restrict the search to a given region of a table. As an example, the search in table (7) can be restricted to values within the time budget of the application. Thus, the example of FIG. 6 can be refined to reflect this fact.

Figure 6C:
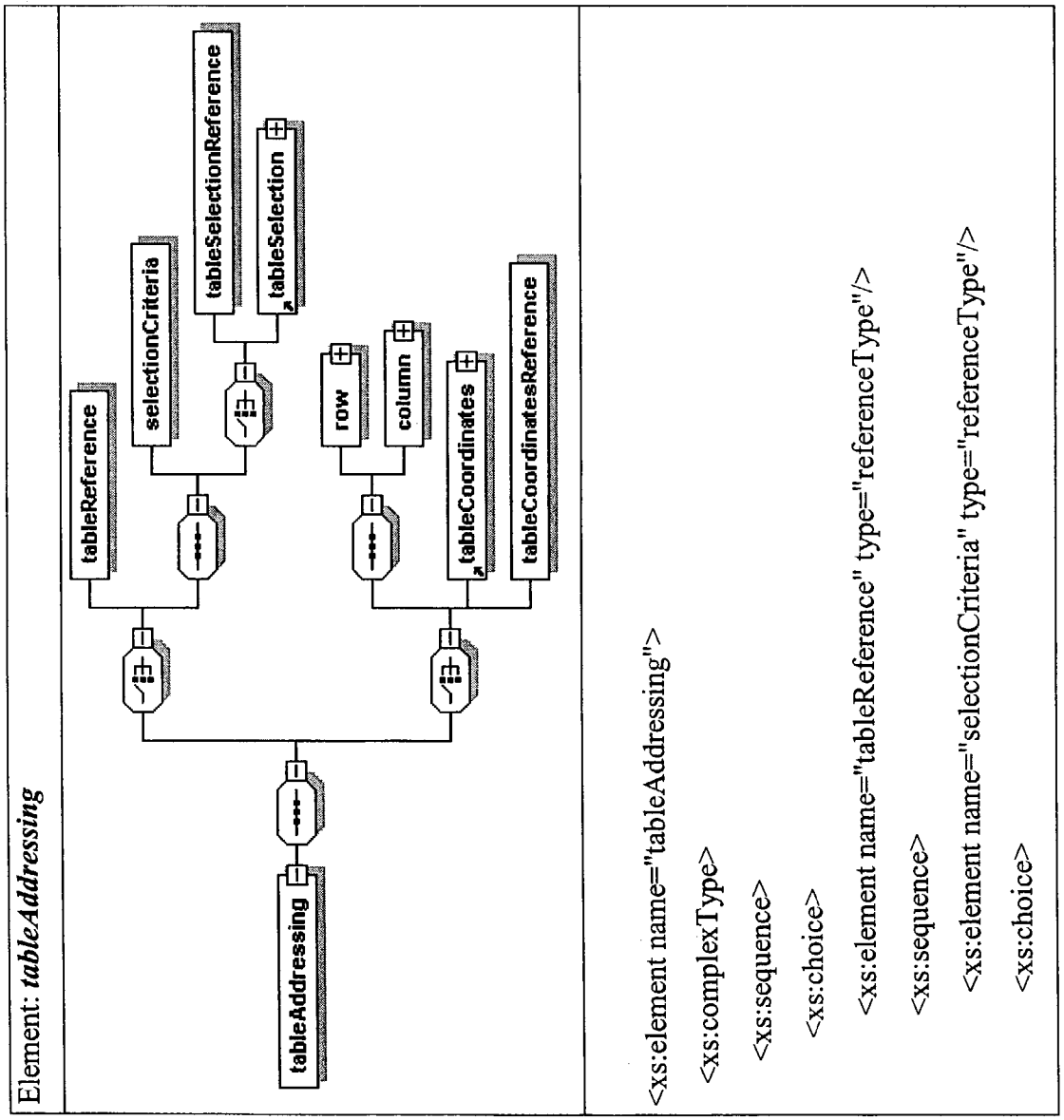
FIG. 6c shows a tagged language representation of a Schema for table selection in accordance with an embodiment of the present invention.
Figure 6C:
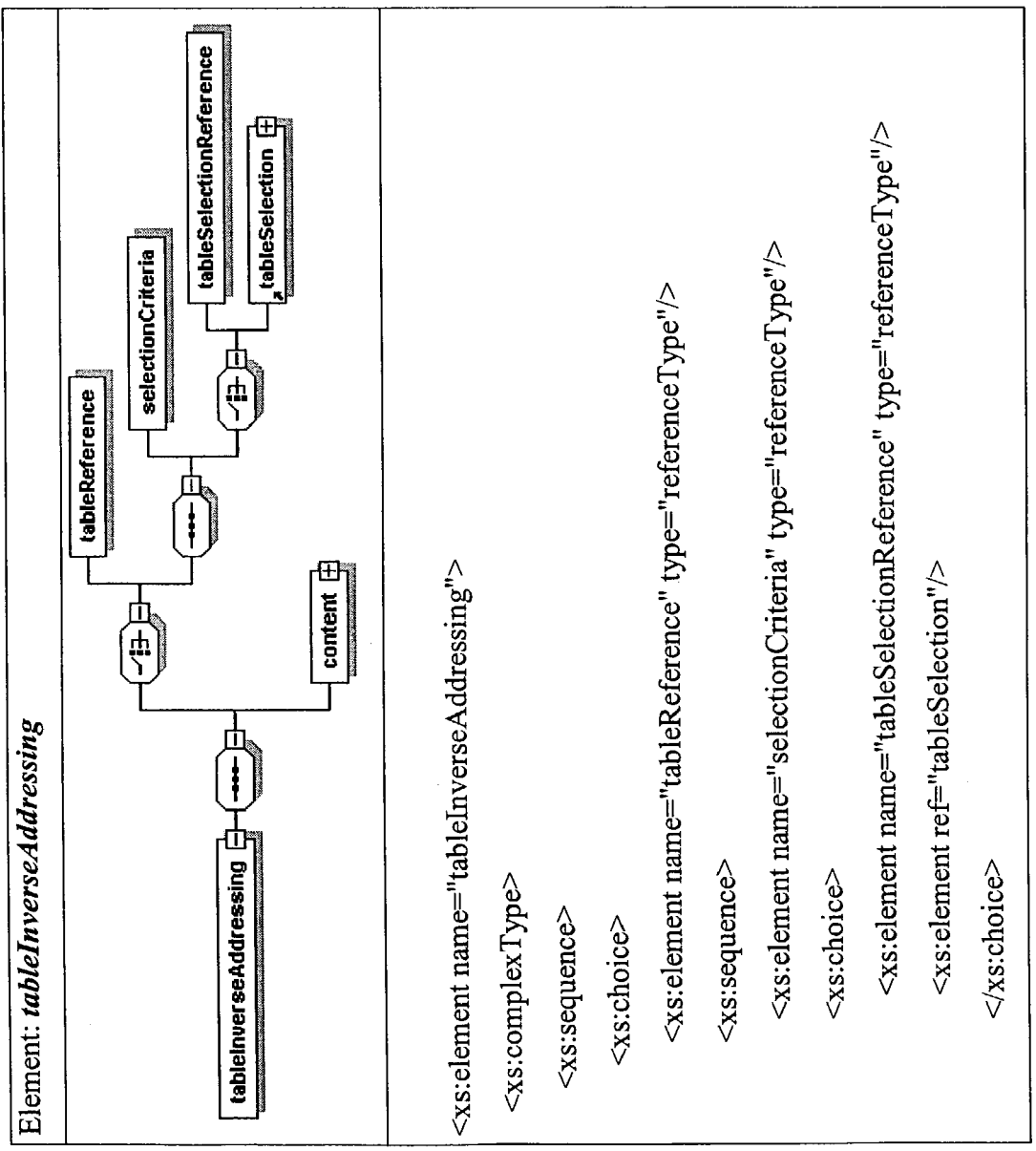
Figure 6C:
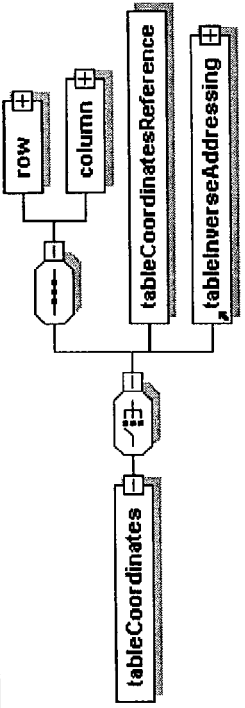
Figure 6C:
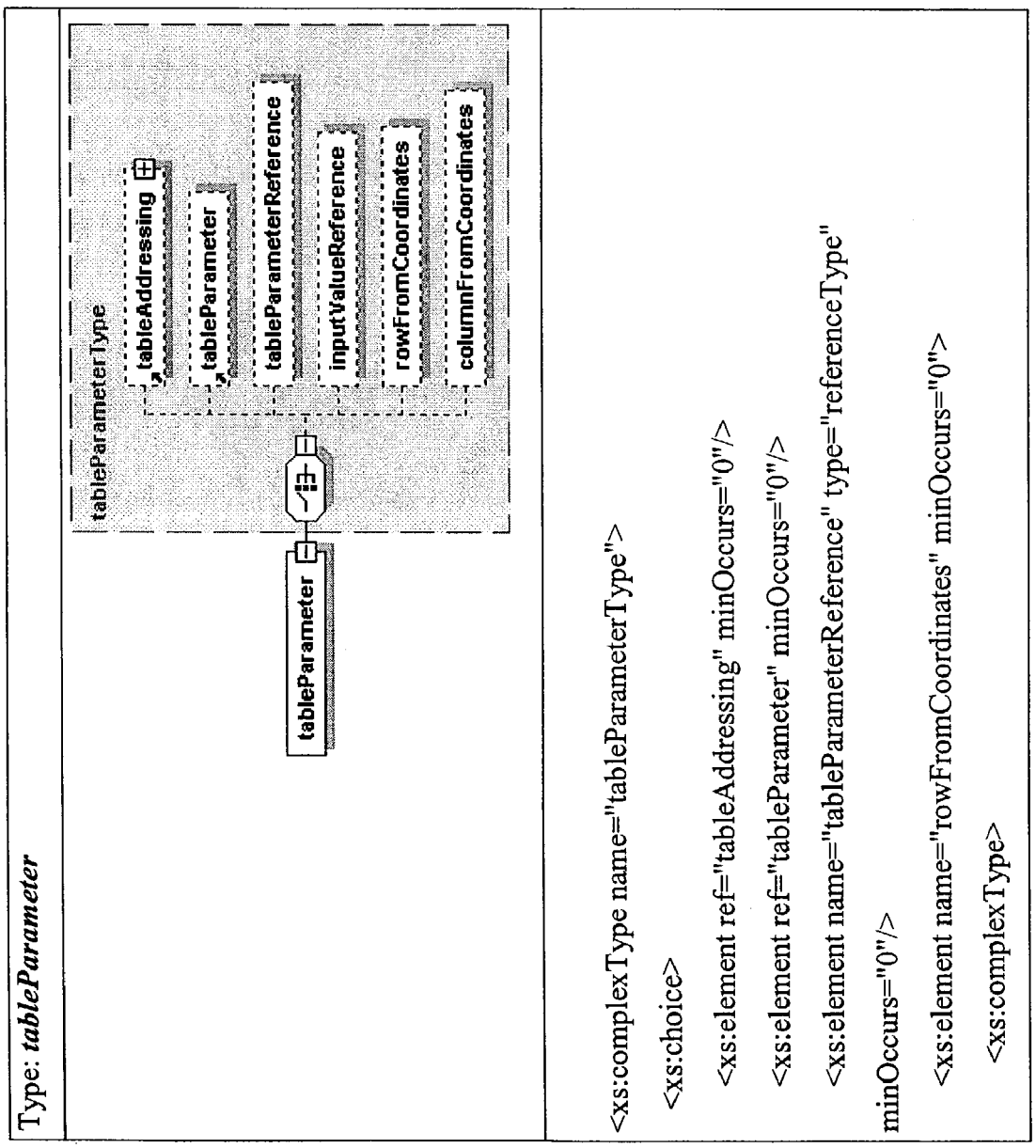

Some embodiments provide a table selection tool, e.g., implemented in XML. It allows combining masking operations on tables or other selections. The Schema specification is shown in FIG. 6c.

In FIG. 7 an example is shown where a first version of the number of levels and bitplanes is obtained according to the quality settings. A selection is applied on the execTime table (table (7)) keeping only the contents with value lower than a given time budget (timeBudget is a unique identifier). Then, the final level and bitplane are obtained using the first version of level and bitplane inside the selection.

A selection called timeWithinBudget is applied. This selection consists of a single operation (masking). The masking is applied on table execTime, the condition type is lower o equal, the target is the content of the table (conditions can also be applied on the axes values). The value for comparison is a reference to a parameter called timeBudget that comes from the terminal specifications.

Several maskings can be applied, combined as a logic AND. For more complex logical operations, maskings are encapsulated on a selection. Several selections can be combined using an operation (AND, OR, ADD, . . . ) and selections can be included together with maskings in higher level selection. In this way, any kind of condition can be expressed. More information can be found in the schema definition in FIG. 6c.

Figure 9:
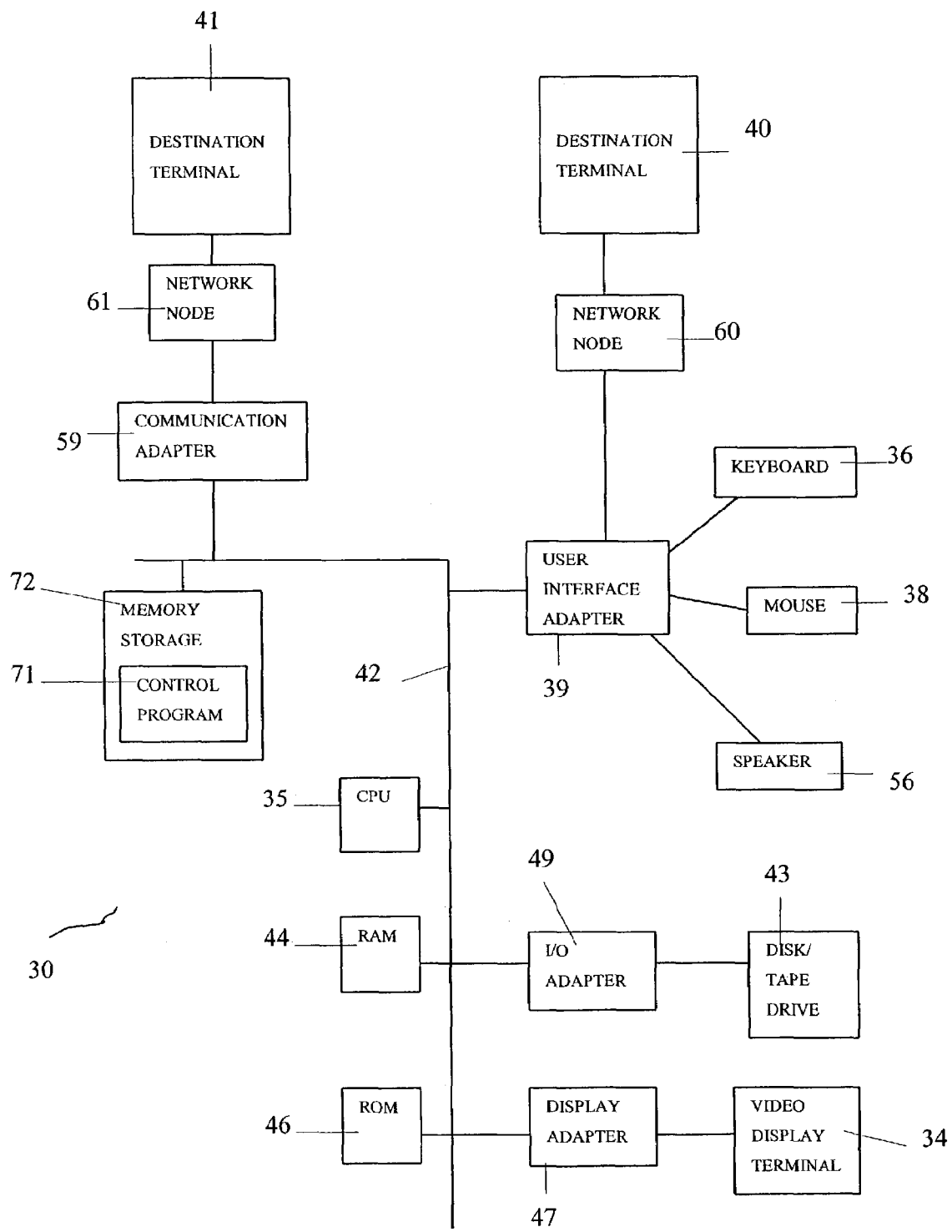
FIG. 9 shows a representative computer system that may be used with embodiments of the present invention.
Figure 10:
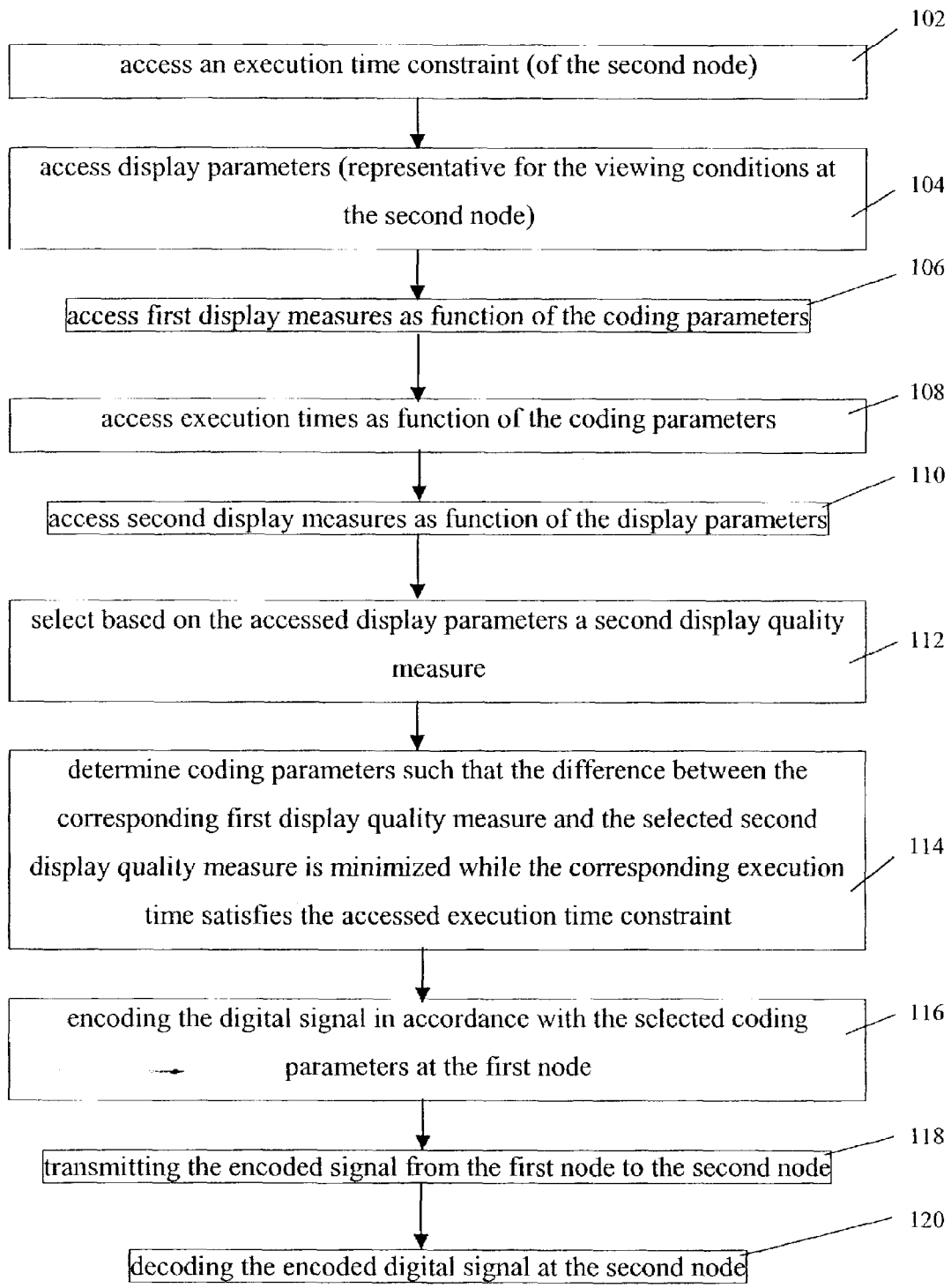
FIG. 10 shows a flow diagram of a method in accordance with an embodiment of the present invention.

FIG. 9 is a schematic representation of a computing system which can be utilized at the server 14 or the node 16 for executing the methods described herein in a network according to certain embodiments. FIG. 10 is a schematic flow diagram of a method according to some embodiments, e.g., as executed by a computer program in accordance with certain embodiment. Referring to FIG. 9, a computer 30 is depicted which may optionally include a video display terminal 34, a data input means such as a keyboard 36, and a graphic user interface indicating means such as a mouse 38. The computer 30 may be implemented as a general purpose computer, e.g., a UNIX server/workstation.

The computer 30 includes a Central Processing Unit ("CPU") 35, for example, a conventional microprocessor such as a Pentium IV processor supplied by Intel Corp. USA is only an example, and a number of other units interconnected via system bus 42. The computer 30 includes at least one memory. Memory may include any of a variety of data storage devices known to the skilled person such as random-access memory ("RAM"), read-only memory ("ROM"), non-volatile read/write memory such as a hard disk as known to the skilled person. For example, the computer 30 may further include random-access memory ("RAM") 44, read-only memory ("ROM") 46, as well as an optional display adapter 47 for connecting system bus 42 to an optional video display terminal 34, and an optional input/output (I/O) adapter 49 for connecting peripheral devices (e.g., disk and tape drives 43) to system bus 42. Video display terminal 34 can be the visual output of the computer 30, which can be any suitable display device such as a CRT-based video display well-known in the art of computer hardware. The computer 30 further includes a user interface adapter 39 for connecting a keyboard 36, mouse 38, optional speaker 56, as well as for communicating with a destination terminal 40. The destination terminal 40 may be connected to the computer system 30 via a telecommunications network such as the Internet, a Wide Area Network or a Local Area Network optionally via one or more intermediate network nodes 60. The computer 30 can also communicate with a further destination terminal 41 accessible via a telecommunications network, optionally via intermediate network nodes 61. Destination terminal 41 may also connected to bus 42 via a communication adapter 59 connecting computer 30 to a data network such as the Internet, an Intranet a Local or Wide Area network (LAN or WAN). This allows transmission of the tabular values mentioned above, e.g., via XML documents, e.g., providing a representation of the computing system of a destination terminal such as 40, 41 over a telecommunications network to the computer 30. For example, the XML descriptions described above can be entered at a far location such as terminal 40, 41 and transmitted to a near location, e.g., the computer 30 via a suitable telecommunications network such as the Internet, where a processor carries out a method in accordance with certain embodiments. In addition, the computer 30 is adapted to make decisions concerning coding of a digital signal which is to be sent to the remote destination terminals 40, 41 where it is to be decoded, processed and displayed. The computer 30 codes a digital signal in accordance with Terminal QoS parameters and sends the coded signal and a descriptor of the coding of the signal to the remote location, e.g., to terminal 40, 41 for decoding and processing, e.g., rendering and display.

Some embodiments also include within its scope that the source digital signal for coding is input directly into the computer 30 using the keyboard 36 or from storage devices such as 43 or by other input devices, e.g., video camera.

The computer 30 may also include a graphical user interface that resides within machine-readable media to direct the operation of the computer 30. Any suitable machine-readable media may retain the graphical user interface, such as a random access memory (RAM) 44, a read-only memory (ROM) 46, a magnetic diskette, magnetic tape, or optical disk (the last three being located in disk and tape drives 43). Any suitable operating system and associated graphical user interface (e.g., Microsoft Windows) may direct CPU 35. In addition, computer 30 includes a control program 71 which resides within a computer memory storage 72. The control program 71 contains instructions that when executed on the CPU 35 carry out the operations described herein with respect to any of the methods of certain embodiments.

Those skilled in the art will appreciate that the hardware represented in FIG. 9 may vary for specific applications. For example, other peripheral devices such as optical disk media, audio adapters, or chip programming devices, such as PAL or EPROM programming devices and the like may be utilized in addition to or in place of the hardware already described.

In the example depicted in FIG. 9, the computer program product (i.e., the control program 71) can reside in the computer storage 72 or any other memory. However, while certain embodiments include aspects relating to mechanisms that are capable of being distributed as a program product in a variety of forms, other embodiments apply equally well regardless of the particular type of signal bearing media used to actually carry out the distribution. Examples of computer readable signal bearing media include: recordable type media such as floppy disks and CD ROMs and transmission type media such as digital and analogue communication links.

Some embodiments also include a computer software product for preparing a first node of a communications system for transmitting an encoded digital signal to a second node of the communication system, the encoded digital signal being generated from a digital signal, the first node providing the encoded digital signal and the first node having access to display parameters associated with the digital signal, the second node being for at least decoding of the encoded signal within an execution time and for subsequent display, the encoding and/or decoding being defined by at least one encoding-decoding scheme in accordance with coding parameters. The software method comprises code which, when executed on a computing device, determines the coding parameters for encoding-decoding in accordance with: (i) one or more first display quality measures of the decoded signal after decoding, the one or more first display quality measures being a function of the coding parameters; (ii) one or more execution times of the decoding of the encoded digital signal, the one or more execution times being a function of the coding parameters; and (iii) one or more second display quality measures, the one or more second display quality measures being a function of the display parameters. The code for determining the coding parameters can include code for linking a second quality display measure with a display parameter associated with the digital signal and code for minimizing a difference between the linked second quality display measure and one first display quality measure while keeping an execution time associated with the one first display quality measure within a constraint. The software may include code for generating at the first node one or more execution times of the decoding of the encoded digital signal in function of the coding parameters from system information defining resources of the second node. The system information may comprise one or more of memory type, microprocessor type, access time to memory, time budget per elementary operation of a processor of the second node. Software for execution on the second node may include code for transmitting the system information defining resources of the second node from the second node to the first node. Software for execution on the first node may include code for generating on the first node one or more execution times of the decoding of the encoded digital signal in function of the coding parameters from decoding algorithm characteristics. The decoding algorithm characteristics may include one or more of: number of multiplications and additions to perform the decoding, number of memory accesses to perform the decoding.

Referring to FIG. 10, a flow diagram is shown of a method 100 which may be carried out at either a first, second or intermediate node of a telecommunications network. In step 102 an execution time constraint (of the second node) is accessed. In step 104 display parameters (representative for the viewing conditions at the second node) are accessed. In step 106 first display measures as function of the coding parameters are accessed. In step 108 execution times as function of the coding parameters are accessed. In step 110 second display measures are accessed as function of the display parameters. In step 112 a second display quality measure is accessed based on the accessed display parameter. In step 114 coding parameters are determined such that the difference between the corresponding first display quality measure and the selected second display quality measure is minimized while the corresponding execution time satisfies the accessed execution time constraint. In step 116 the digital signal is encoded in accordance with the selected coding parameters at the first node. In step 118 the encoded signal is sent from the first node to the second node, e.g., via a network path. In step 120 the encoded digital signal is decoded accordingly at the second node and can be displayed, e.g., rendered.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. The embodiments described above are to be considered in all respects as illustrative only and not restrictive in any manner.

What is claimed is:

1. A method of determining coding parameters for encoding-decoding a digital signal in a communications system, the method comprising:
    providing a first value of one or more display parameters associated with the digital signal;
    providing a first plurality of values for a display quality measure of the decoded signal after decoding, each value being linked with a corresponding value of the coding parameters;
    providing a plurality of values for execution times of the decoding of the encoded digital signal, each value being linked with a corresponding value of the coding parameters;
    providing a second plurality of values for the display quality measure, each value being linked with a corresponding value of the display parameters; and
    determining values of the coding parameters by selecting one of the second plurality of values for the display quality measure linked with the provided first value of the display parameters in accordance with the provided plurality of values for execution times and the first plurality of values for the display measure.

2. The method of claim 1, wherein determining the coding parameters is performed when preparing a first node of a communications system for transmitting an encoded digital signal to a second node of the communication system, the encoded digital signal being generated from a digital signal, the first node providing the encoded digital signal and the first node having access to the display parameters associated with the digital signal, the second node being adapted to decode the encoded signal within an execution time and for subsequent display, the encoding and decoding being defined by at least one encoding-decoding scheme in accordance with a plurality of coding parameters.

3. The method of claim 2, wherein the at least one encoding-decoding scheme is scalable so that a quality degradation resulting from selection of the first display quality measure results in a shorter decoding execution time.

4. The method of claim 1, wherein the determining of the coding parameters further comprises:

linking one of the second plurality of values for the display quality measure with the first value of the display parameter;
    minimizing a difference between the linked value in the second plurality of values for the quality display measure and a selected value in the first plurality of values for the display quality measure; and
    concurrently with minimizing, maintaining an execution time associated with the selected value in the first plurality of values for the display quality measure within a constraint.

5. The method of claim 2, wherein the digital signal is a representation of at least one image of a 3-D object.

6. The method of claim 5, wherein the display parameters represent viewing conditions of the 3-D object at the second node.

7. The method of claim 6, wherein the display parameters include one or more of: visualization distance of the object when displayed, viewing angle of the object when displayed.

8. The method of claim 2, wherein the coding-decoding scheme is based on one of a wavelet transform, a discrete cosine transform, a FFT, a DFT.

9. The method of claim 2, wherein the coding parameters include one or more of: number of levels of the coding scheme, number of bits per compression co-efficient of the coding scheme, ratio of number of source signal frames to the number of frames of the source signal used in the coding scheme in a framed data signal.

10. The method of claim 2, wherein the coded signal is a MPEG-2 or 4 or JPEG 2000 signal.

11. The method of claim 1, wherein the display measure includes one or more of: PSNR, a degradation value defined as any difference between an object's image, rendered at unconstrained resources and the object's image obtained after rendering with degraded settings.

12. The method of claim 2, wherein the first node generates the execution times of the decoding of the encoded digital signal in function of the coding parameters from system information defining resources of the second node.

13. The method of claim 12, wherein the system information comprises one or more of memory type, microprocessor type, access time to memory, time budget per elementary operation of a processor.

14. The method of claim 12, further comprising transmitting the system information defining resources of the second node from the second node to the first node.

15. The method of claim 12, wherein the first node generates the execution times of the decoding of the encoded digital signal in function of the coding parameters from decoding algorithm characteristics.

16. The method of claim 15, wherein the decoding algorithm characteristics include one or more of: number of multiplications and additions to perform the decoding, number of memory accesses to perform the decoding.

17. An apparatus for determining coding parameters for encoding-decoding a digital signal in a communications system, the apparatus comprising:
    means for a first value of one or more display parameters associated with the digital signal;
    means for providing a first plurality of values for a display quality measure of the decoded signal after decoding, each value being linked with a corresponding value of the coding parameters;
    means for providing a plurality of values for execution times of the decoding of the encoded digital signal, each value being linked with a corresponding value of the coding parameters, and means for providing a second plurality of values for the display quality measure, each value being linked with a corresponding value of the display parameters; and means for determining values of the coding parameters by selecting one of the second plurality of values for the display quality measure linked with the provided first value of the display parameters in accordance with the provided plurality of values for execution times and the first plurality of values for the display measure.

18. The apparatus of claim 17, wherein determining the coding parameters is performed when preparing a first node of a communications system for transmitting an encoded digital signal to a second node of the communication system, the encoded digital signal being generated from a digital signal, the first node providing the encoded digital signal and the first node having access to the display parameters associated with the digital signal, the second node being adapted to decode the encoded signal within an execution time and for subsequent display, the encoding and decoding being defined by at least one encoding-decoding scheme in accordance with a plurality of coding parameters.

19. The apparatus of claim 17, wherein the means for determining the coding parameters further comprises:

means for linking one of the second plurality of values for the display quality measure with the first value of the display parameter;

means for minimizing a difference between the linked value in the second plurality of values for the quality display measure and a selected value in the first plurality of values for the display quality measure; and concurrently with minimizing, means for maintaining an execution time associated with the selected value in the first plurality of values for the display quality measure within a constraint.

20. The apparatus of claim 18, wherein the means for providing the execution times is adapted to generate the execution times from system information defining resources of the second node.

21. The apparatus of claim 20, further comprising means for transmitting the system information defining resources of the second node from the second node to the first node.

22. The apparatus of claim 17, wherein means for providing the execution times selects from decoding algorithm characteristics.

23. A computer readable storage medium storing the computer program product for determining coding parameters for encoding-decoding a digital signal in a communications system, the computer program product comprising code which, when executed on a computing device, comprises the method:

providing a first value of one or more display parameters associated with the digital signal;

providing a first plurality of values for a display quality measure of the decoded signal after decoding, each value being linked with a corresponding value of the coding parameters;

providing a plurality of values for execution times of the decoding of the encoded digital signal, each value being linked with a corresponding value of the coding parameters;

providing a second plurality of values for the display quality measure, each value being linked with a corresponding value of the display parameters; and determining values of the coding parameters by selecting one of the second plurality of values for the display quality measure linked with the provided first value of the display parameters in accordance with the provided plurality of values for execution times and the first plurality of values for the display measure.

24. A computer system for determining coding parameters for encoding-decoding a digital signal in a communications system, the computer system comprising:

a first memory comprising one or more display parameters associated with the digital signal and information describing a first plurality of values for a display quality measure of the decoded signal after decoding, each value being linked with a corresponding value of the coding parameters;

a second memory comprising information describing a plurality of values for execution times of the decoding of the encoded digital signal, each value being linked with a corresponding value of the coding parameters; and a third memory comprising information describing a second plurality of values for the display quality measure, each value being linked with a corresponding value of the display parameters; and a control program having instructions that when executed on the computer system comprises:

determining values of the coding parameters by selecting one of the second plurality of values for the display quality measure linked with the provided first value of the display parameters in accordance with the provided plurality of values for execution times and the first plurality of values for the display measure.

25. The computer system of claim 24, wherein the determining of the coding parameters further comprises:

linking one of the second plurality of values for the display quality measure with the first value of the display parameter;

minimizing a difference between the linked value in the second plurality of values for the quality display measure and a selected value in the first plurality of values for the display quality measure; and concurrently with minimizing, maintaining an execution time associated with the selected value in the first plurality of values for the display quality measure within a constraint.

26. The method of claim 1, wherein the method is performed at a first node of the communication system to determine coding parameters, the first node being configured to encode the digital signal based on the determined coding parameters and to transmit the encoded signal to a second node, the second node being configured to decode the encoded signal within the selected execution times.

27. The method of claim 2, further comprising linking the first plurality of values for the display quality measure with the second plurality of values for the display quality measure while taking into account the execution times.

28. A method of encoding a digital signal at a first node in a communication system, the communication system comprising the first node encoding the digital signal and transmitting the encoded signal to a second node, the second node being configured to decode the encoded signal and display the decoded signal, the method comprising:

at the first node, providing a first value of one or more display parameters associated with the digital signal;

providing a first plurality of values for a display quality measure of the decoded signal after decoding, each value being linked with a corresponding value of the coding parameters;

providing a plurality of values for execution times of the decoding of the encoded digital signal, each value being linked with a corresponding value of the coding parameters;

providing a second plurality of values for the display quality measure, each value being linked with a corresponding value of the display parameters; and determining values of the coding parameters by selecting one of the second plurality of values for the display quality measure linked with the provided first value of the display parameters in accordance with the provided plurality of values for execution times and the first plurality of values for the display measure.

29. A method of determining coding parameters for encoding-decoding a digital signal in a communications system, the communication system comprising at least a heterogeneous set of terminals connected in a network, the method comprising:

at each of the terminals, providing a first value of one or more display parameters associated with the digital signal;

providing a first plurality of values for a display quality measure of the decoded signal after decoding, each value being linked with a corresponding value of the coding parameters;

providing a plurality of values for execution times of the decoding of the encoded digital signal, each value being linked with a corresponding value of the coding parameters;

providing a second plurality of values for the display quality measure, each value being linked with a corresponding value of the display parameters; and determining values of the coding parameters by selecting one of the second plurality of values for the display quality measure linked with the provided first value of the display parameters in accordance with the provided plurality of values for execution times and the first plurality of values for the display measure.

30. A method of encoding a digital signal at a first node in a communication system, the communication system comprising the first node encoding the digital signal and transmitting the encoded signal to a second node, the second node being configured to decode the encoded signal and display the decoded signal, the method comprising:

providing a display quality function associating a unique value of display quality with each of a set of values of at least one coding parameter, the display quality indicating the display quality of the digital signal after being encoded with a corresponding value of the coding parameter;

providing an execution time function associating a unique value of execution time with each of a set of values of the coding parameter, the execution time indicating the time for the second node to decode the digital signal encoded with a corresponding value of the coding parameter upon receiving the encoded signal;

determining a target value for display quality of the encoded digital signal based on the viewing conditions at the second node;

selecting a value for the coding parameter based on the display quality function and the execution time function such that the execution time value associated with the coding parameter value in the execution time function is under a target execution time and the difference between the display quality value associated with the coding parameter value in the display quality function and the target display quality value is minimized; and coding the digital signal using the selected value for the coding parameter.

31. The method of claim 30, wherein the determining of a target value for display quality comprises:

storing a display parameter function associating a unique value of target display quality with each of a set of values of at lease one display parameter, the value of the display parameter being determined by viewing conditions at the second node; and determining the value of target display quality associated with a first value of the display parameter based on the display parameter function, the first value being determined by the second node.

* * * * *